United States Patent [19]

Hasebe

[11] Patent Number: 4,933,877

[45] Date of Patent: Jun. 12, 1990

[54] BIT MAP IMAGE PROCESSING APPARATUS HAVING HARDWARE WINDOW FUNCTION

[75] Inventor: Kouki Hasebe, Tokyo, Japan

[73] Assignee: Kabushiki Kaisha Toshiba, Kawasaki, Japan

[21] Appl. No.: 174,807

[22] Filed: Mar. 29, 1988

[30] Foreign Application Priority Data

Mar. 30, 1987 [JP] Japan ........................ 62-76665
Apr. 30, 1987 [JP] Japan ........................ 62-106805

[51] Int. Cl.[5] ........................ G06F 3/153

[52] U.S. Cl. ........................ 364/521; 340/721; 340/734

[58] Field of Search ........................ 364/518, 521; 340/721, 340/724, 734

[56] References Cited

U.S. PATENT DOCUMENTS

| | | | |
|---|---|---|---|
| 4,412,296 | 10/1983 | Taylor | 364/521 |
| 4,694,288 | 9/1987 | Harada | 340/721 |
| 4,700,320 | 10/1987 | Kapur | 364/521 |
| 4,710,761 | 12/1987 | Kapur et al. | 340/721 |
| 4,769,762 | 9/1988 | Tsujido | 364/521 |
| 4,777,485 | 10/1988 | Costello | 340/724 X |
| 4,780,710 | 10/1988 | Tatsumi | 340/721 |
| 4,783,648 | 11/1988 | Homma et al. | 340/724 |
| 4,806,919 | 2/1989 | Nakayama et al. | 340/721 |
| 4,814,884 | 3/1989 | Johnson et al. | 340/724 X |
| 4,819,189 | 4/1989 | Kikuchi et al. | 364/521 |

*Primary Examiner*—Gary V. Harkcom
*Assistant Examiner*—Mark K. Zimmerman
*Attorney, Agent, or Firm*—Cushman, Darby & Cushman

[57] ABSTRACT

A bit map image processing apparatus includes a window detector for detecting a window position on a screen and a frame memory for storing image data. The frame memory has p 2-port memories each having an l bits×m (column)×n (row) memory area. Each row of the two-dimensional memory area of the frame memory is divided and managed in units of l·p bits. The apparatus further has a first multiplexer for selecting as a read memory address one of a background memory address and a window memory address in accordance with a detection result of the window detector, a second multiplexer for selecting as a memory address one of read address output from the first multiplexer and a write address input thereto in accordance with the detection result of the window detector, an address converter for converting the memory address output from the second multiplexer into individual memory addresses for each 2-port memory, and a shift register section for converting into serial data the image data output in units of l bits from the p 2-port memories in accordance with the individual memory addresses.

16 Claims, 14 Drawing Sheets

| INPUT | | | | OUTPUT | | | | | | | |
|---|---|---|---|---|---|---|---|---|---|---|---|
| DT | X4 | X3 | X2 | S0 | S1 | S2 | S3 | S4 | S5 | S6 | S7 |
| 1 | 0 | 0 | 0 | 0 | 0 | 0 | 0 | 0 | 0 | 0 | 0 |
| 1 | 0 | 0 | 1 | 1 | 0 | 0 | 0 | 0 | 0 | 0 | 0 |
| 1 | 0 | 1 | 0 | 1 | 1 | 0 | 0 | 0 | 0 | 0 | 0 |
| 1 | 0 | 1 | 1 | 1 | 1 | 1 | 0 | 0 | 0 | 0 | 0 |
| 1 | 1 | 0 | 0 | 1 | 1 | 1 | 1 | 0 | 0 | 0 | 0 |
| 1 | 1 | 0 | 1 | 1 | 1 | 1 | 1 | 1 | 0 | 0 | 0 |
| 1 | 1 | 1 | 0 | 1 | 1 | 1 | 1 | 1 | 1 | 0 | 0 |
| 1 | 1 | 1 | 1 | 1 | 1 | 1 | 1 | 1 | 1 | 1 | 0 |
| 0 | X | X | X | 0 | 0 | 0 | 0 | 0 | 0 | 0 | 0 |

FIG. 8

| P2 | P1 | P0 | PRIORITY | q1 | q0 |
|---|---|---|---|---|---|
| 0 | 0 | 0 | W3 > W2 > W1 | 1 | 1 |
| 0 | 0 | 1 | W3 > W1 > W2 | 1 | 1 |
| 0 | 1 | 0 | ——— | 1 | 1 |
| 0 | 1 | 1 | W1 > W3 > W2 | 0 | 1 |
| 1 | 0 | 0 | W2 > W3 > W1 | 1 | 0 |
| 1 | 0 | 1 | ——— | 1 | 0 |
| 1 | 1 | 0 | W2 > W1 > W3 | 1 | 0 |
| 1 | 1 | 1 | W1 > W2 > W3 | 0 | 1 |

BIT MAP IMAGE PROCESSING APPARATUS HAVING HARDWARE WINDOW FUNCTION

BACKGROUND OF THE INVENTION

The present invention relates to a bit map image processing apparatus having a hardware window function.

In recent bit map image processing apparatuses such as a bit map display apparatus, a display function called multiwindow display is needed to display a plurality of data on a single display screen. As a means for performing window display, (1) a software window in accordance with a bitblot scheme (bit block transfer scheme); and (2) a hardware window in accordance with display address control are conventionally known as described in NIKKEI ELECTRONICS, 1986. 5. 19 (no. 395. pp. 221-250). With software method (1), when the window size is increased, the transfer time is prolonged, as described in the above literature. In addition, the response speed is lowered and priority setting is complex when windows overlap.

In contrast to this, with hardware method (2), in the case of i82786 (display control LSI available from Intel Corp., U.S.A.) described in the above literature, if the number of windows is increased, updating of the contents of a memory such as a descriptor becomes complex when a window is to be moved, a display address is to be changed, or the priority is to be changed. Also, the number of memory access times performed by i82786 is increased, resulting in degradation in performance of the processor. In i82786, when an image 2-port memory is used as a frame memory, the hardware window function cannot be used, or even if it can be, the number of additional circuits is increased.

SUMMARY OF THE INVENTION

The present invention has been made in view of the above situations and has as its object to provide a bit map image processing apparatus wherein a 2-port memory is used as a frame memory and an efficient hardware window function can be enabled. The bit map image processing apparatus according to the present invention comprises a window detector for detecting a window position on a screen and a frame memory for storing image data. The frame memory has p 2-port memories each having an l bits×m (column)×n (row) memory area. Each row of the each 2-port memory is divided and managed in units of l bits. The same memory addresses are assigned to l bits regions of the, 2-port memories in accordance with a predetermined order. The apparatus further has a first multiplexer for selecting one of a background memory address and a window memory address as a read memory address in accordance with a detection result of the window detector, a second multiplexer for selecting as the memory address one of the read memory address output from the first multiplexer and a write memory address input thereto in accordance with scanning of display addresses on a display field, an address converter for converting the memory address output from the second multiplexer into an individual memory address for each 2-port memory, and a shift register section for converting into serial data data output from the 2-port memories in units of l bits by the 2-port memory addresses converted by and output from the address converter.

It is another object of the present invention to provide a bit map image processing apparatus wherein a 2-port memory is used as a frame memory to enable an efficient hardware window function and display priority control among a plurality of hardware windows can be easily performed.

The bit map image processing apparatus of the present invention comprises a window detector for detecting in units of regions whether a current display scan address on a display field falls within a plurality of window display regions that are arbitrarily designated, a window display priority setting section for designating a display priority among the plurality of window display regions, a frame memory for storing image memory, a first multiplexer for selecting, in accordance with the detection result of the window detector and the display priority, as a read memory address one of a background memory address indicating an address on a frame background field corresponding to the display field and a window memory address indicating an address on a frame window field designated in accordance with the display priority, a second multiplexer for selecting, as a memory address one of the read memory address from the first multiplexer and a write address input thereto in accordance with the detection result of the window detector, an address converter for converting the memory address output from the second multiplexer into individual memory addresses for the respective 2-port memories, and a shift register section for converting into serial data the image data output from the 2-port memories in units of l bits in accordance with the individual memory addresses. Therefore, a change in the display priority of the window display regions can be performed by changing the set result of the priority setting section.

As described above in detail, according to the present invention, since a hardware window using a 2-port memory can be obtained, high-speed transfer can be performed. In this case, the circuit arrangement is simple, circuit integration can be easily performed, and a high resolution can be obtained. Furthermore, according to the present invention, designation of a display priority among a plurality of hardware windows can be performed as required, and the priority can be changed easily at a high speed. Even when some windows overlap, switching among the windows based on the priority can be easily performed.

BRIEF DESCRIPTION OF THE DRAWINGS

FIG. 8 shows an input/output logic of the address decoder shown in FIG. 7;

DESCRIPTION OF THE INVENTION

A bit map display apparatus according to the present invention will be described in detail with reference to the accompanying drawings.

Figure 1:
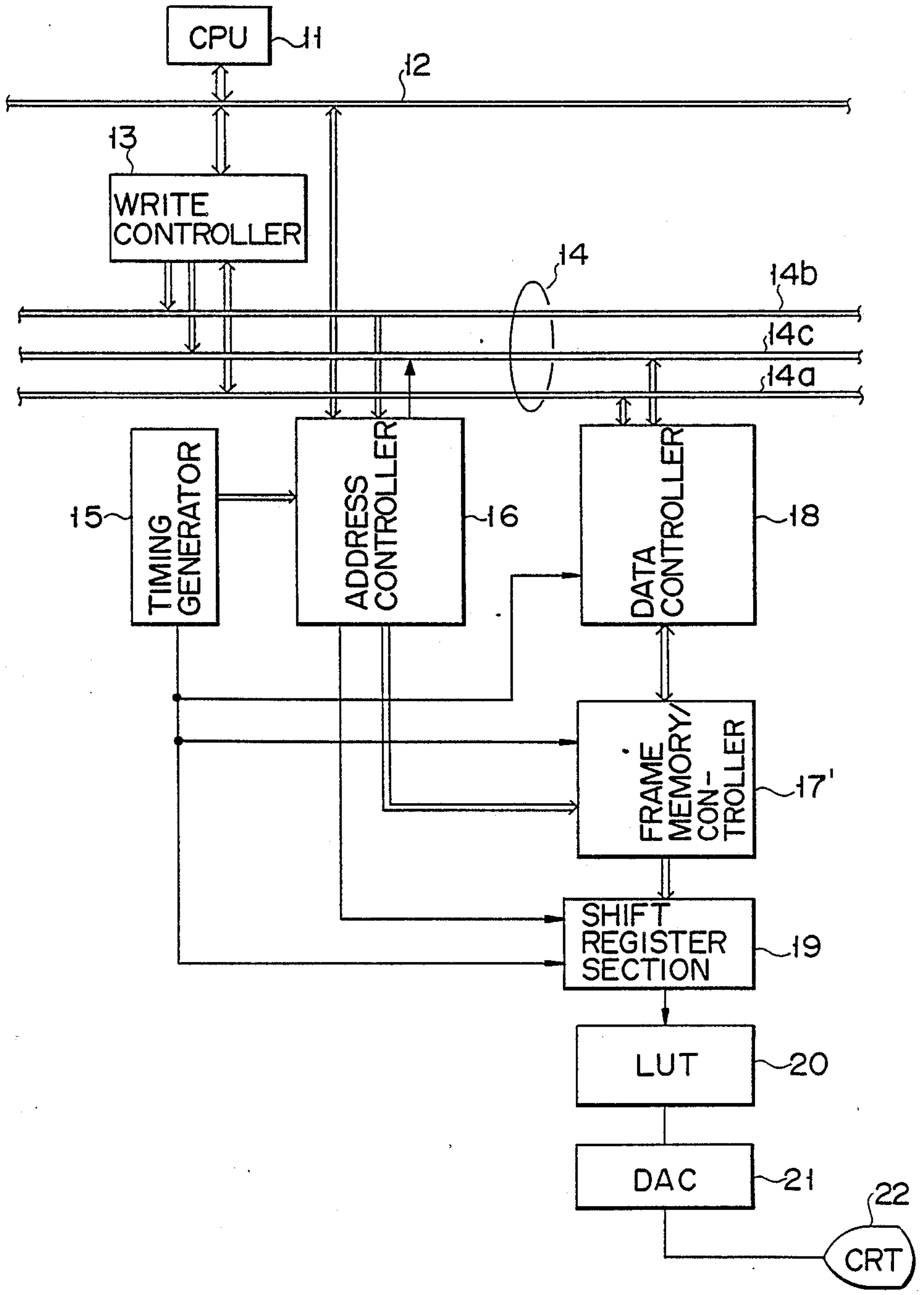
FIG. 1 is a block diagram showing the arrangement of the present invention.

FIG. 1 is a block diagram of the bit map display apparatus according to an embodiment of the present invention. Referring to FIG. 1, CPU 11 controls the entire system and is connected to system bus 12. Write controller 13 performs such a write operation as graphic processing, straight line generation and bitblot (bit block transfer) operation. Of write bus 14, controller 13 outputs a write word onto write data bus 14*a*, a write address onto write address bus 14*b*, and control data onto control bus 14*c* when the write word is written into frame memory 17 to be described later. If the write operation is performed by CPU 11, write controller 13 and write bus 14 can be omitted.

Timing generator 15 generates a clock signal, vertical and horizontal sync signals, a blanking signal, and the like, for CRT monitor 22 to be described later. Address controller 16 generates a read memory address in accordance with the clock signal from generator 15, selects as a memory address one of the read memory address and a write memory address from write address bus 14*b*. Frame memory 17 in frame memory/controller 17' stores image data. Controller 18 performs such data processing as color conversion, arithmetic operations (raster operations), and alignment processing. When the image data is to be written in memory 17 in accordance with the control data from controller 13, data controller 18 writes the write word from write data bus 14*a* into a location of memory 17 addressed through the memory address from controller 16. Data controller 18 can be omitted. Shift register section 19 converts display data output from frame memory 17 into serial data. Look-up table (LUT) 20 receives output data from register section 19 and performs color conversion and luminance conversion. Digital/analog converter (DAC) 21 converts output data from look-up table 20 into an analog signal. CRT monitor 22 displays an output signal from converter 21 as a video signal.

Figure 2:
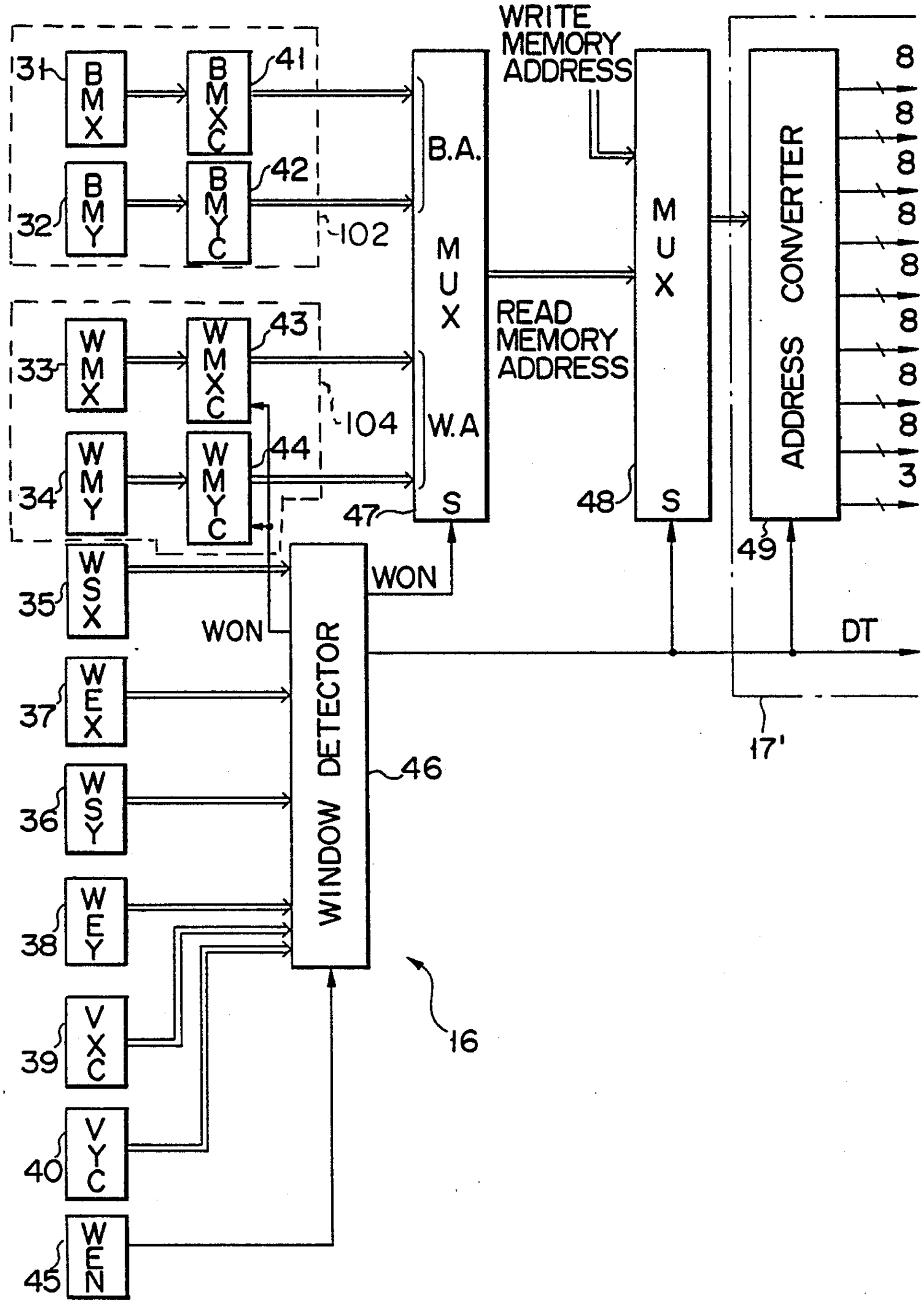
FIG. 2 is a block diagram showing the arrangement of a first embodiment of an address controller shown in FIG. 1.

FIG. 2 is a block diagram of address controller 16 according to a first embodiment of the present invention. The hardware window concept employed in the first embodiment will be described with reference to FIG. 3 before configuration of controller 16 will be described. In the first embodiment, the frame memory space (FMS) or the frame field of frame memory 17 has 2048×1024 dots and a screen space (SS) or a screen field on CRT monitor 22 has 1280×1024 dots. In this embodiment, frame memory space FMS of memory 17 is set to be sufficiently large in the row direction in comparison to screen space SS of CRT monitor 22.

A 1280×1024 dots field having an arbitrary point (BMx, BMy) of frame memory space FMS as its start point corresponds to the screen field. This field will be called a frame background field hereinafter. A rectangular field arbitrarily defined on the screen field by a point (WSx, WSy) and a point (WEx, WEy) will be called a screen window field. A rectangular field having the same size as that of the screen window field and having a point (WMx, WMy) arbitrarily designated on frame memory space FMS as its start point will be called a frame window field. When image data within the frame window field is displayed by a hardware structure, on the screen window field in place of the screen field, it is said that hardware window display is performed.

Figure 4:
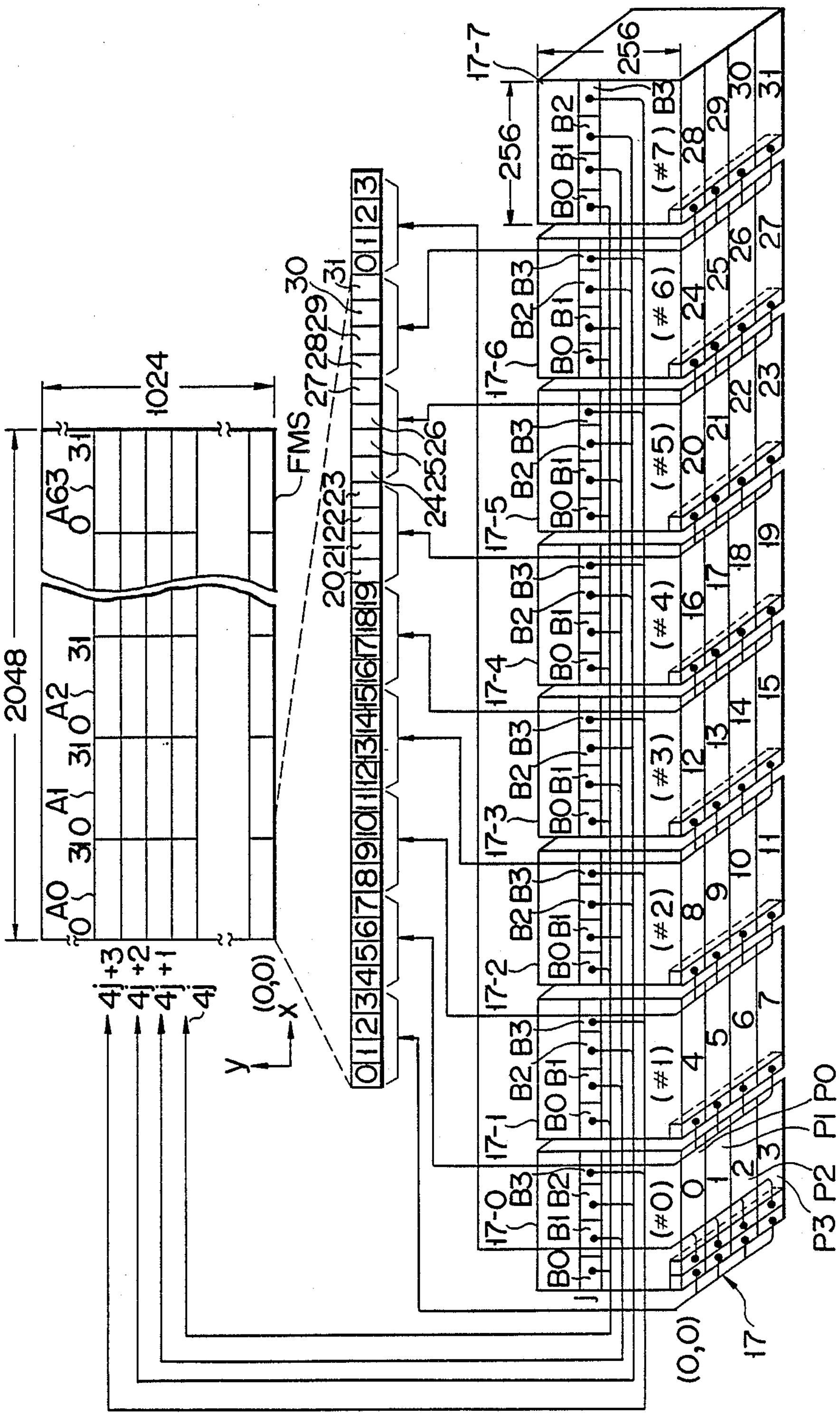
FIGS. 4 and 5 are views for explaining the memory map of the frame memory shown in FIG. 1 and address allocation.

The memory arrangement of frame memory 17 for realizing frame memory space FMS described above will be described with reference to FIGS. 4 and 5. Frame memory 17 is constituted using eight 2-port memories 17−i (i=0 to 7) as shown in FIG. 4. Each 2-port memory 17−i comprises, e.g., a μPD41264 available from NEC Corp. and has a two-dimensional memory space having a memory capacity of 256 (columns)×256 (rows)×4 bits. Each row of frame memory space FMS realized by 2-port memories 17−i is divided into 64 columns Ai (i=0 to 63) in units of 32 bits, i.e., in units of words.

Bits 0 to 3 of the word of the 0th row and the A0th column of frame memory space FMS correspond to 4 bits of the 0th row and the 0th column of 2-port memory 17−0, and bits 4 to 7 of the 0th row and the A0th column of frame memory space FMS correspond to 4 bits of the 0th row and the 0th column of 2-port memory 17−1. Similarly, bits 28 to 31 of the 0th row and the A0th column of memory space FMS correspond to 4 bits of the 0th row and the 0th column of 2-port memory 17−7. 4-bit regions respectively including bits 0 to 3, bits 4 to 7, . . . , and bits 28 to 31 of the 0th row and the A1st column of frame memory space FMS correspond to 4 bits of the 0th row and the 1st column of each of 2-port memories 17−0 to 17−7. In this manner, data is stored in units of 4-bit blocks.

Similarly, the 4-bit regions of the 0th row and the A63rd column of frame memory space FMS correspond to the 4-bit regions of the 0th row and the 63rd column of 2-port memories 17−0 to 17−7, respectively, and the 4-bit regions of the 1st row and the A0th column of frame memory space FMS correspond to the 4-bit regions of the 0th row and the 64th column of 2-port memories 17−0 to 17−7, respectively. The 4-bit regions of the 2nd row and the A0th column of frame memory space FMS correspond to the 4-bit regions of the 0th row and the 128th column of 2-port memories 17−0 to 17−7, respectively, and the 4-bit regions of the 3rd row and the A0th column of frame memory space FMS correspond to the 4-bit regions of the 0th row and the 192 column of 2-port memories 17−0 to 17−7, respectively.

Each 2-port memory 17−i has a 256×4 bit register. When memory 17−i is accessed, one row data including a word to be accessed is stored by the register and serially output in units of 4 bits.

More specifically, in this embodiment, assuming that the regions obtained by dividing each row of 2-port memories 17−i (i=0 to 7) in units of 256 bits is denoted as regions B0 to B3, 4-bit regions of the respective columns of regions B0 of the jth row (j=0 to 255) are distributed and assigned to A0 to A63 bits $4_i$ to $4_{i+3}$ of the $4_j$th row of frame memory space FMS, and the 4-bit regions of the respective columns of regions B1 of the jth row of regions B1 of the jth row are distributed and assigned to A0 to A63 bits $4_i$ to $4_{i+3}$ of the $4_{j+1}$th row of memory space FMS. Similarly, the 4-bit regions of the respective columns of regions B2 of the jth row of memory 17−i are distributed and assigned to A0 to A63 bits $4_i$ to $4_{i+3}$ of the $4_{j+2}$th row of memory space FMS, and the 4-bit regions of the respective columns of regions B3 of the jth row of memory 17−i are distributed and assigned to A0 to A63 bits $4_i$ to $4_{i+3}$ of the $4_{j+3}$th row of memory space FMS.

Figure 5:
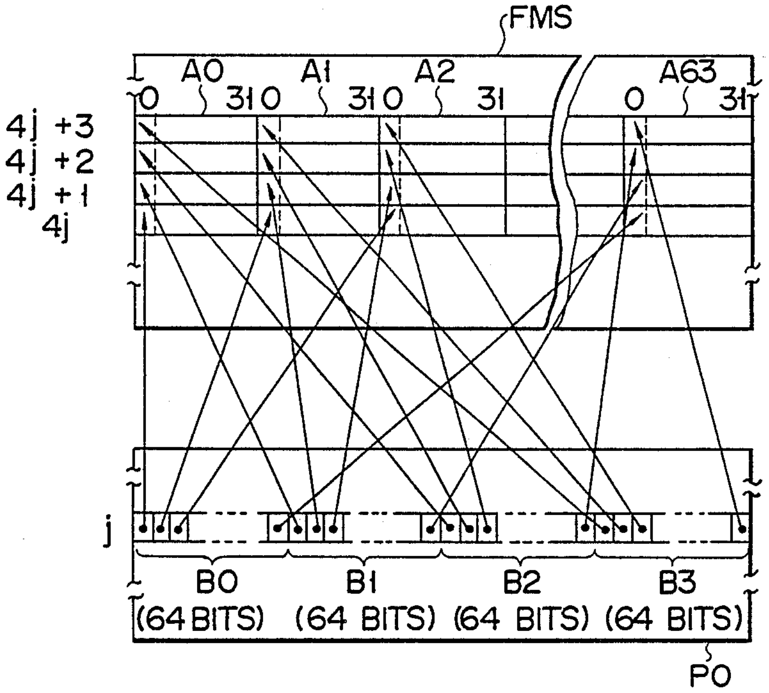

Each 2-port memory 17−i has 4 memory planes P0 to P3 (FIG. 4) assigned to bits 0 to 3 of the A0th to A63rd columns of frame memory space FMS. Therefore, bits 0 to 63 of region B0 of the jth row (j=0 to 255) of plane P0 are assigned to A0 to A63 bits 0 of the $4_j$th row of memory space FMS, as shown in FIG. 5, and A0 to A63 bits 0 to 63 of region B1 of the jth column of plane P0 are assigned to bits 0 of the $4_{j+1}$th row of memory space FSM. Similarly, bits 0 to 63 of region B2 of the jth row of plane P0 are assigned to A0 to A63 bits 0 of the $4_{j+2}$th row of memory space FMS, as shown in FIG. 5, and bits 0 to 63 of region B3 of the jth column of plane P0 are assigned to A0 to A63 bits 0 of the $4_{j+3}$th row of memory space FSM.

The x address (x-coordinate) of a given two-dimensional memory address (coordinates) of frame memory space FMS is indicated by 11 bits of x10 to x0 since the number of pixels of memory space FMS in the horizontal (row) direction is 2048. The y address (y-coordinate) of the same address is indicated by 10 bits of y9 to y0 since the number of pixels of memory space FMS in the vertical (column) direction is 1024.

Figure 6:
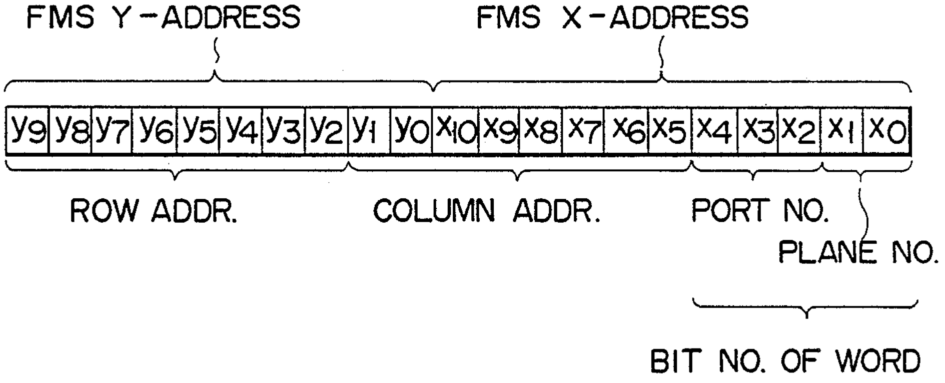
FIG. 6 shows the address format when the frame memory is to be addressed.

Address bits x1 and x0 represent a memory plane in 2-port memory 17−i to which an address is assigned, and address bits x4 to x2 indicating memory chip (port) number #i of 2-port memory to which the address is assigned, as is apparent from the arrangement of frame memory 17. Therefore, 5 address bits x4 to x0 indicate a bit position within a word region to which the address is assigned. The link address of 2 lower bits y1 and y0 of the y address and 6 upper bits x10 to x5 represents the column address of 2-port memory 17−i to which the address is assigned, and 8 upper bits y9 to y2 of the y address represent the column address of 2-port memory 17−i to which the address is assigned. FIG. 6 shows the above relationship.

Address controller 16 shown in FIG. 2 will be described. Referring to FIG. 2, when a frame background field is designated, start coordinates BMx and BMy of the frame background field are set in registers BMX 31 and BMY 32, respectively, by CPU 11. When a frame window field is designated, start coordinates WMx and WMy of the frame window field are set in registers WMX 33 and WMY 34, respectively, by CPU 11. Start display coordinates WSx and WSy and end display coordinates WEx and WEy of the screen window field corresponding to the frame window field are set in display window registers WSX 35 and WSY 36, and WEX 37 and WEY 38, respectively, by CPU 11. Scan counter VXC 39 counts up in accordance with a clock signal from timing generator 15 and is reset in synchronism with a horizontal blanking signal. Scan counter VYC 40 counts down one by one, from a value which is present in accordance with a vertical blanking signal from generator 15, in accordance with a horizontal blanking signal from generator 15. As a result, a current scanned display position on the screen field is indicated. It is designated to window enable register WEN45 by CPU 11 whether or not the window display is to be performed.

Background address counters BMXC 41 and BMYC 42 indicate x address bits x10 to x0 and y address bits y9 to y0 of a read memory address of a frame background field. The read memory addresses are generated in synchronism with scanning of the display positions on the screen field. When a horizontal blanking line is generated on the screen field, counter BMXC 41 presets data of register BMX 31 in accordance with a holizontal blanking signal from timing generator 15 and counts up in units of words, i.e. 32 by 32, in accordance with the clock signal from generator 15 as the display address is scanned on the screen field. The counted data is output as an x address. When a vertical blanking line is generated on the screen field, counter BMYC 42 presets data of register BMY32 in accordance with a vertical blanking signal from generator 15 and counts down one by one in accordance with a horizontal blanking signal from generator 15. The counted data is output as a y address. Registers 31 and 32 and counters 41 and 42 constitute a background address generator 102.

Window address counters WMXC 43 and WMYC 44 indicate a read memory address of a frame window field corresponding to a current display position. Counter WMXC 43 presets data of register WMX 33 in accordance with signal WON and counts up in units of words, i.e., 32 by 32, in accordance with a clock signal from timing generator 15 as the display position is scanned on the screen field when signal WON is input. The counted data is output as an x address of the window. Counter WMYC 44 presets data of register WMY 34 in accordance with a vertical blanking signal from generator 15 when a vertical blanking line is generated on the screen field and counts down one by one in accordance with a horizontal blanking signal from generator 15 when signal WON is input. The counted data is output as a y address of the window. Registers 33 and 34 and counters 43 and 44 constitute a window address generator 104.

When a window display is designated by register 45, window detector 46 compares the contents of registers 35 to 38 and the contents of scan counters 39 and 40. When the current display position indicated by scan counters 39 and 40 falls within the screen window field defined by registers 35 to 38, window detector 46 outputs window detection signal WON. Detector 46 also outputs data transfer signal DT when a horizontal blanking line is generated and when the display position indicated by scan counters 39 and 40 falls within or outside the screen window field indicated by registers 35 to 38.

Multiplexer MUX47 selectively outputs one of a background read memory address indicated by counters 41 and 42 and a window read memory address indicated by counters 43 and 44 in accordance with window detection signal WON supplied from window detector 46. As an address selector, multiplexer 48 selects one from a write memory address supplied from write controller 13 through write address bus 14*b* and a read memory address selectively output from multiplexer 47, in accordance with data transfer signal DT from detector 46 and outputs the selected memory address to address converter 49. Registers 35 to 38 and 45, counters 39 and 40, window detector 46, an a multiplexers 47 and 48 constitute an address controller.

Address converter 49 of frame memory/controller 17' is responsive to data transfer signal DT from window detector 46 and converts a memory address (a y address of y9 to y0 and an x address of x10 to x0) output from multiplexer 48 into 8 individual addresses for each 2-port memory 17-i (i=0 to 7).

Figure 7:
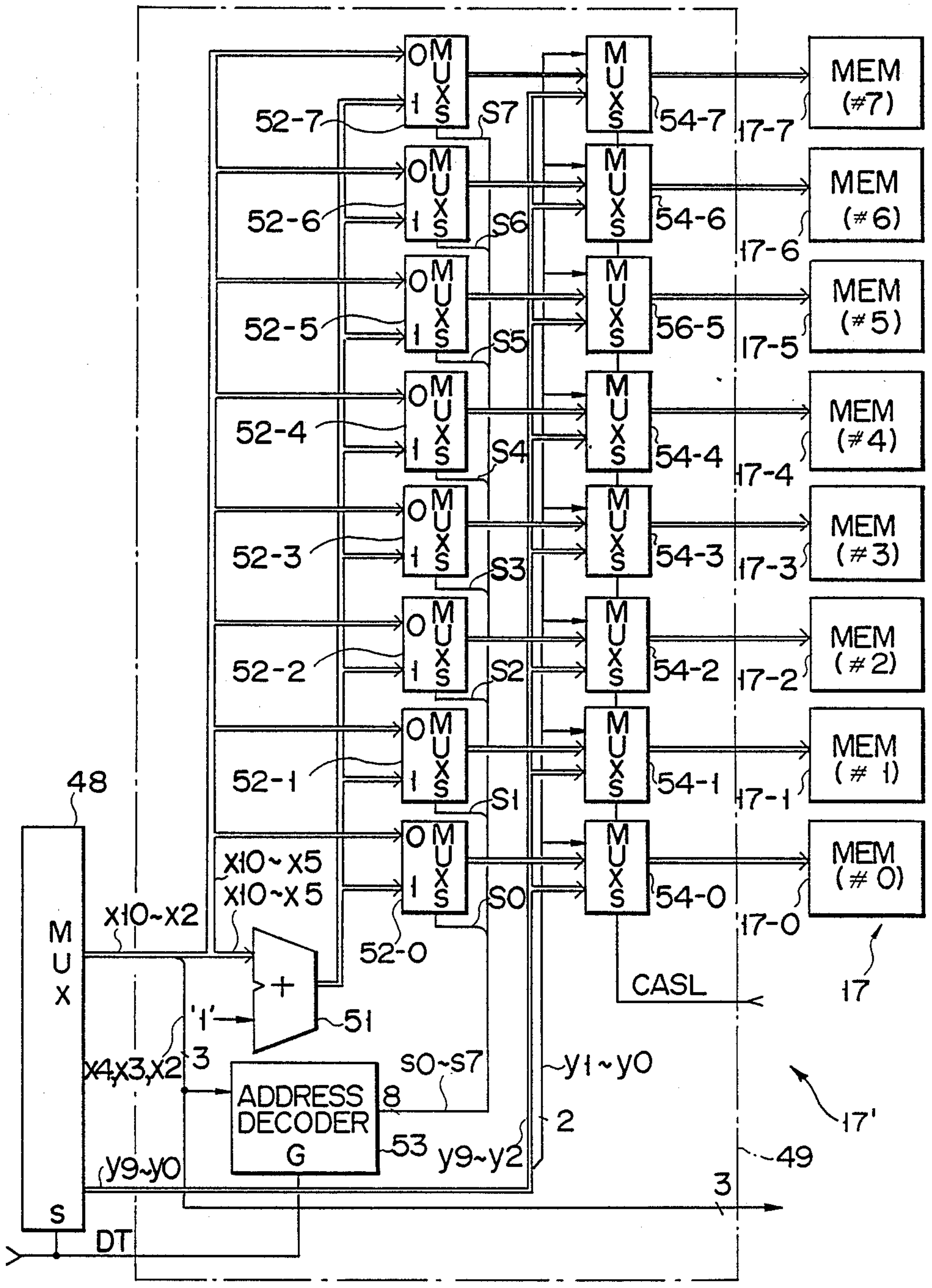
FIG. 7 is a block diagram of the address converter in the address controller shown in FIG. 1.

FIG. 7 is a block diagram of address converter 49. Referring to FIG. 7, adder 51 adds one to x address bits x10 to x5 of the memory address output from multiplexer 48. Multiplexers 52-0 to 52-7 are arranged to correspond to 2-port memories 17−0 to 17−7 and select either x addresses of bits x10 to x5 from multiplexer 48 or the x addresses which is increased by one by adder 51, respectively. The selected x addresses and y address of bit y1 and y0 are column addresses of the individual addresses for memory 17−i, respectively. Based on 3 bits x4 to x2 of the memory address output from multiplexer 48 and data transfer signal DT from window detector 46, address decoder 53 generates selection signals S0 to S7 to be supplied to selection control terminals S of multiplexers 52-0 to 52-7. FIG. 8 shows the input/output logic of address decoder 53. More specifically, the individual column address is obtained by adding address bits y1 and y0 of the memory address output from multiplexer 48 to the upper address bits selectively output from multiplexers 52-0 to 52-7. One of the individual column address and the y address bits y9 to y2 of the memory address output from multiplexer 48 as the individual row address is selectively output to frame memories 17−i in accordance with switching signal CASL from a memory timing circuit (not shown) of frame memory/controller 17'. The memory timing circuit performs a data transfer memory cycle in accordance with a data transfer signal DT, and performs random access memory cycles while the signal DT is not input.

Figure 9:
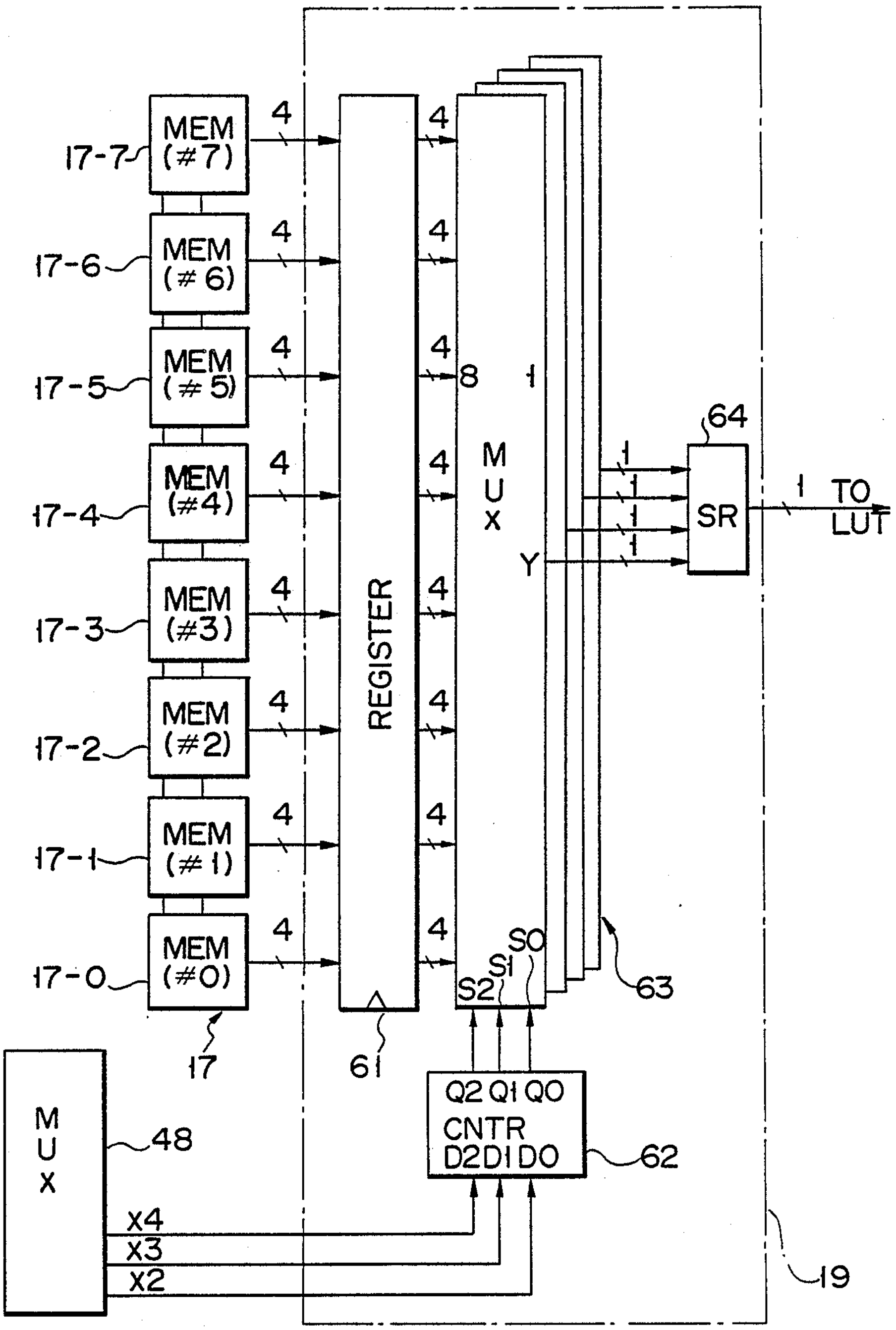
FIG. 9 is a block diagram of the shift register section shown in FIG. 1.

FIG. 9 is a block diagram of shift register section 19 shown in FIG. 1. Referring to FIG. 9, 32-bit register 61 latches data that are sequantially output from 2-port memories 17−0 to 17−7 in units of 4 bits. Register 61 can be omitted in a low-resolution, low-speed system. Three-bit chip designation counter CNTR 62 designates which one of the data output from 2-port memories 17−i (i=0 to 7) is to be currently displayed. More specifically, counter 62 loads 3 bits x4 to x2 of the memory address output from multiplexer 48 in synchronism with memory cycle and counts up 8 times during each memory cycle.

Eight-input, one-output multiplexer 63 selects one of the 4-bit data that are output from 2-port memories 17−0 to 17−7 and latched by register 61, in accordance with the count of counter 62. Four-bit shift register SR 64 converts 4-bit data selectively output from multiplexer 63 into serial bit data and outputs the converted bit data to look-up table (LUT) 20 shown in FIG. 1.

The operation of the first embodiment of the present invention will be described.

Normal background display will be described first with reference to FIGS. 10A to 10G. Memory start coordinate data BMx and BMy for a frame background field are set in registers 31 and 32 in address controller 16 through system bus 12 by CPU 11. Register 45 is reset.

Figure 10:
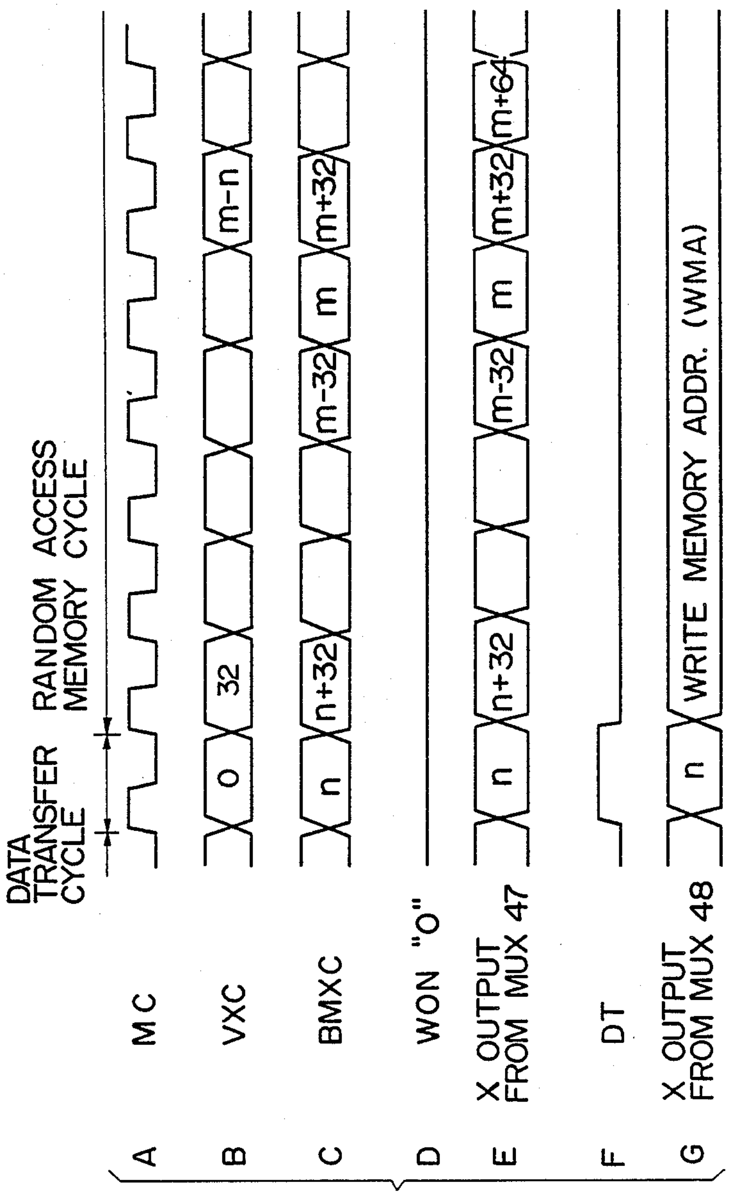
FIGS. 10A to 10G are timing charts for explaining the operation for background display.

Coordinate data BMx is set in counter 41 in accordance with a horizontal blanking signal, and data BMy is set in counter 42 in acordance with a vertical blanking signal. Data of counter 41 is counted up 32 by 32 in synchronism with scanning of the display positions, as shown in FIG. 10C. Data of counter 42 is counted down in accordance with the horizontal blanking signal. A background read memory address is output from counters 41 and 42.

Since register 45 is reset, window detection signal WON is set at level "0" by window detector 46, as shown in FIG. 10D. As a result, the background read memory address from counters 41 and 42 is selected as a read memory address by multiplexer 47. Multiplexer 48 selects the read memory address output from multiplexer 47 when data transfer signal DT from window detector 46 is at level "1". Therefore, a data transfer memory cycle is performed. Window detector 46 sets signal DT of level "1" when horizontal blanking is generated, as shown in FIG. 10F. Multiplexer 48 selects a write memory address from write controller 13 as the memory address when signal DT is at level "0". Therefore, random access memory cycles are performed, and write words of image data from controller 18 are written into memory 17 at the write addresses every memory cycle, as shown in FIG. 10A.

Three bits x4 to x2 of the read memory address selected by multiplexer 48 and data transfer signal DT from window detector 46 are supplied to address decoder 53 in address converter 49 shown in FIG. 7. Address decoder 53 outputs selection signals S0 to S7 shown in FIG. 8 in accordance with the combinations of the logic values of x address bits x4 to x2 and signal DT.

More specifically, when data transfer signal DT is at level "0", all selection signals S0 to S7 are set at level "0" regardless of memory address bits x4 to x2. When signal DT is at level "1" and when all memory address bits x4 to x2 are at level "0", all selection signals S0 to S7 are set at level "0". In this case, word data is transferred from the word boundary of the 32-bit region of frame memory space FMS of frame memory 17, i.e., from bit 0. In contrast to this, when word data is transferred from a position within the 32-bit region not corresponding to the word boundary, i.e., when at least one of memory address bits x4 to x2 is at level "1", signals S0 to Si are set at level "1" in accordance with the decoded result of memory address bits x4 to x2. Here, i is a number indicated by bits x4 to x2. Since selection signal S7 is constantly at level "0", multiplexer 52-7 always selects bits x10 to x5 from multiplexer 48. Therefore, multiplexer 52-7 can be omitted.

Multiplexer 52-i (i=0 to 7) selects memory address bits x10 to x5 selected by multiplexer 48 when selection signal pulse Si (i=0 to 7) is at level "0" and selects a value obtained by adding one to memory address bits x10 to x5 by adder 51 when selection signal pulses Si is at level "1". Two bits y1 and y0 of memory address bits y9 to y0 selected by multiplexer 48 with the upper bit data (x10 to x5, or x10 to x5+1) selected by multiplexer 52−i (i=0 to 7) and memory address bits bits y9 to y2 selected by multiplexer 48 are selectively output from multiplexers 54-0 to 54-7 as individual column and row addresses for 2-port memories 17−0 to 17−7, respectively.

As a result, when the value of memory address bits x4 to x2 is k, 2-port memories 17−k to 17−7 are designated by the memory address and 2-port memories 17−0 to 17−(k−1) are designated by the added memory address. An output in units of 32 bits from a position not corresponding to a word boundary is thus generated.

Data transfer signal DT is generated by window detector 46 when the horizontal blanking line is generated on the screen, and is also supplied to a memory timing circuit (not shown). The memory timing circuit generates memory clock MCK and performs data transfer in 2-port memory 17−i in accordance with data transfer signal DT and in synchronism with memory clock MCK and inhibits random access of write controller 13 or CPU 11.

2-port memories 17−i are addressed by individual memory addresses selectively output from multiplexers 54−i (i=0 to 7). Thus, a data transfer memory cycle for loading the 4×256 bits of the respective rows of 2-port memories 17−i designated by the individual row addresses in their shift registers (not shown) is performed. Thereafter, 4 bits from column designated by a column address of the each individual memory address are sequentially output in synchronism with memory clock MCK.

Four-bit output data from 2-port memories 17−i are latched in register 61 shown in FIG. 9 in synchronism with the output operation. Memory address bits x4 to x2 selected by multiplexer 48 are loaded in counter 62 simultaneously with the latching operation of register 61 within a data transfer memory cycle wherein data transfer signal DT is at level "1". Counter 62 counts up data 8 times in each memory cycle.

Of the 4-bit data output from 2-port memories 17−i and latched by register 61, multiplexer 63 sequentially selects output data from a 2-port memory with a port number (#i) represented by the count of counter 62. As a result, multiplexer 63 sequentially and selectively outputs 4-bit data from 2-port memories 17−i, in the order of port number #i, #i+1, . . . , #7, #0, . . . , #i-1. Each 4-bit data from multiplexer 63 is converted into serial data by shift register 64. The serial data from register 64 is supplied to look-up table 20 and displayed on the screen field of CRT monitor 22.

The above operation will be described in more detail. Assume that display is performed starting from memory coordinates of the 1023th row and the 12th column of frame memory space FMS of frame memory 17. In this case, memory address bits x4 to x2 indicate "3" and this value is loaded in counter 62. Therefore, data is repeatedly and selectively output from 2-port memories 17−0 to 17−7 in units of 4 bits in the order of #3, #4, . . . , #7, #0, #1, and #2. When the value represented by memory address bits x4 to x2 is "3", the column addresses for port numbers #0 to #2 are incremented by one and are thus larger by one than those of other 2-port memories 17−3 to 17−7. Therefore, during each memory cycle, 32-bit serial data is output from shift register 64 in the following order. First, 4 bits from memory 17−3, 4 bits from the same rows and the same columns of memories 17−4 to 17−7 as these of memory 17−3, and 4 bits from the same rows and the next columns of memories 17−0 to 17−2 are located.

Figure 3:
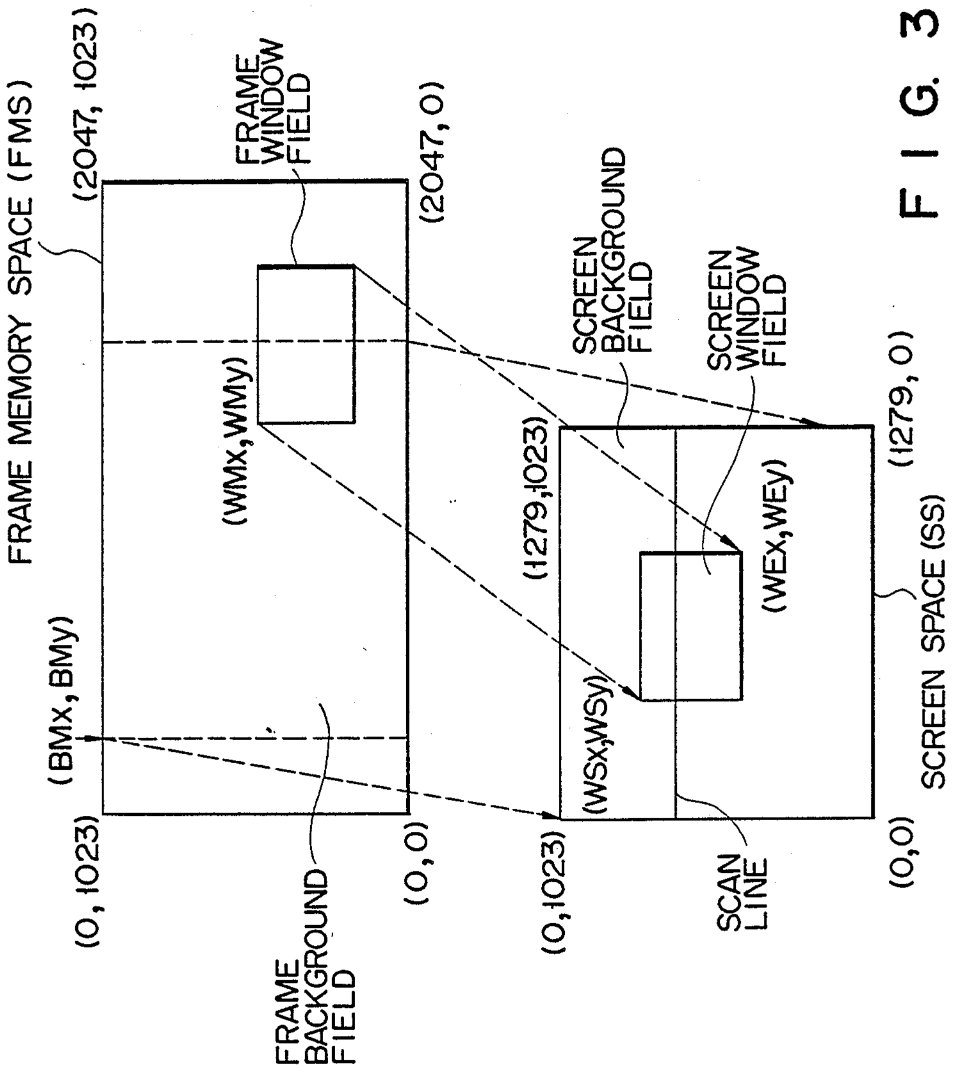
FIG. 3 is a view for explaining the hardware window concept.

Window display will be described with reference to the timing charts of FIGS. 11A to 11G. Assume that a window is designated as shown in FIG. 3 and the display position is scanned on a line shown in FIG. 3. When window display is needed, CPU 11 sets start coordinates WSx and WSy of the frame window field for hardware window display in registers 35 and 36, end coordinates WEx and WEy in registers 37 and 38, and window enable register 45. When register 45 is set, window display is allowed.

Figure 11:
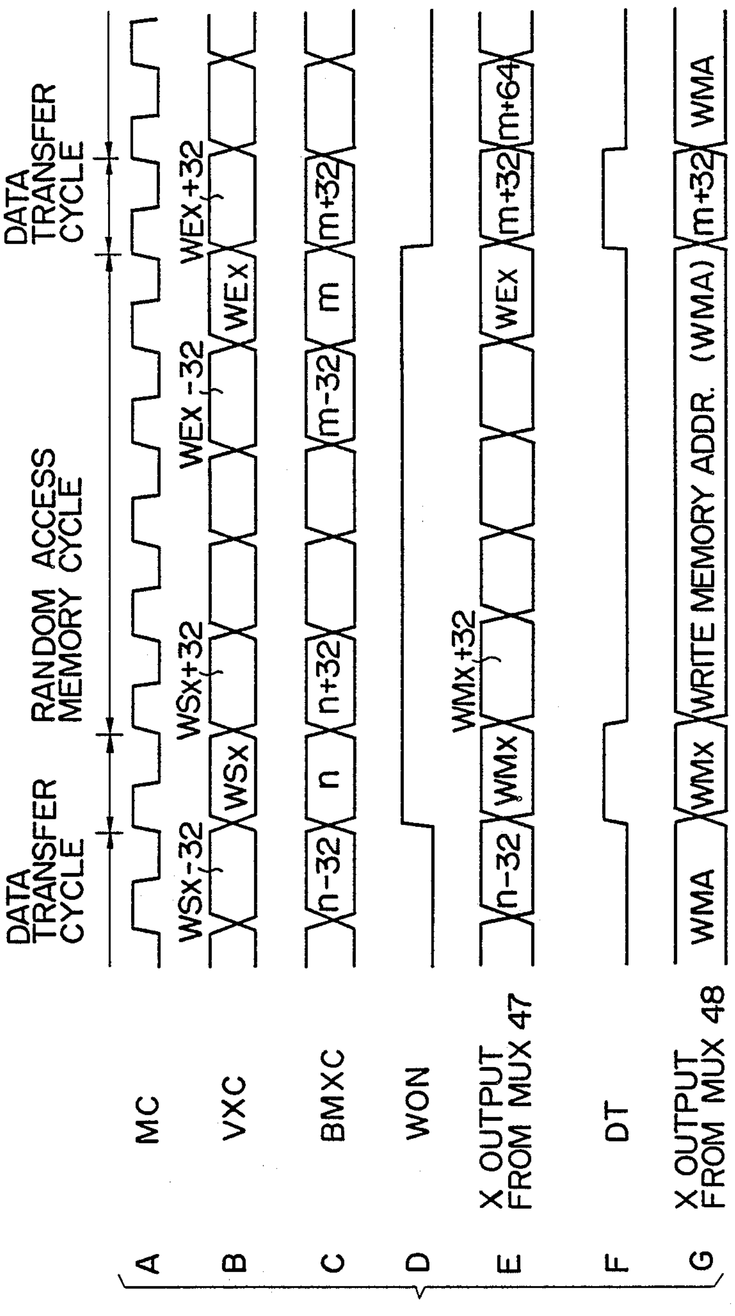
FIGS. 11A to 11G are timing charts for explaining the operation for hardware window display.

In this case, window detector 46 sets window detection signal WON at level "1", as shown in FIG. 11D while the y address represented by counter 40 falls within the y-direction boundary of the window indicated by registers 36 and 38 between a memory cycle and the x address represented by counter 39 falls within the x-direction boundary of the window indicated by registers 35 and 37. Furthermore, window detector 46 sets data transfer signal DT at "1" during a memory cycle when the count of counter 39 coincides with the value of register 35 and the next memory cycle when the count of counter 39 coincides with the value of register 37, as shown in FIG. 11F.

When window detection signal WON from window detector 46 is at level "1", multiplexer 47 selects a window memory address indicated by counters 43 and 44. The window memory address as a read memory address selectively output from multiplexer 47 is selectively output as a memory address from multiplexer 48 to address converter 49 only when data transfer signal DT from detector 49 is at "1". Converter 49 converts the read memory address into individual memory addresses for 2-port memories 17−0 to 17−7 in the similar manner as in the case of background display described above. When signal DT is at level "1", memories 17−0 to 17−7 are addressed by the individual memory addresses from address converter 49. Then, 4×256 bits of the respective rows of memories 17−0 to 17−7 designated by the individual memory addresses are loaded in their registers (not shown) and sequentially output in units of 4-bits, starting from the 4-bits of the designated column, in synchronism with memory clock MCK. The respective 4-bit sequentially output data from memories 17−0 to 17−7 are repeatedly output in a switching manner in the order of memory numbers #k, #k+1, . . . , #7, #0, . . . , #k-1, where k is the value represented by address bits x4 to x2 selected by multiplexer 48, in the same manner as in the case of background display described above. The memory content of the window region is displayed in this manner.

In a memory cycle where the count of counter 39 coincides with the value of register 37, data transfer signal DT becomes "1", as described above. In this case, window detection signal WON is set at "0". In a memory cycle where signal DT is "1" and signal WON is "0", the background memory address represented by counters 41 and 42 is selectively supplied to converter 49 and the background display described above is resumed.

As described above, according to the present invention, the start x-coordinate of frame memory 17 from which background display or window display are performed can be designated precisely in units of 4 bits. The start y-coordinate can be designated in units of dots in both background display and window display. However, it is easy to alter the system so that the start x-coordinate can be designated in units of bits.

In this embodiment, the size of the frame memory space in the vertical direction is the same as that of the screen space. However, the present invention can also be applied to a larger frame memory space when the concept of the window display is applied to background display.

A bit map display apparatus has been described above. The present invention can be applied to an apparatus having a frame memory and extracting and outputting the content of an arbitrary rectangular region of the frame memory, e.g., a laser printer and an electrostatic plotter.

A bit map display apparatus according to a second embodiment of the present invention will be described.

Figure 13:
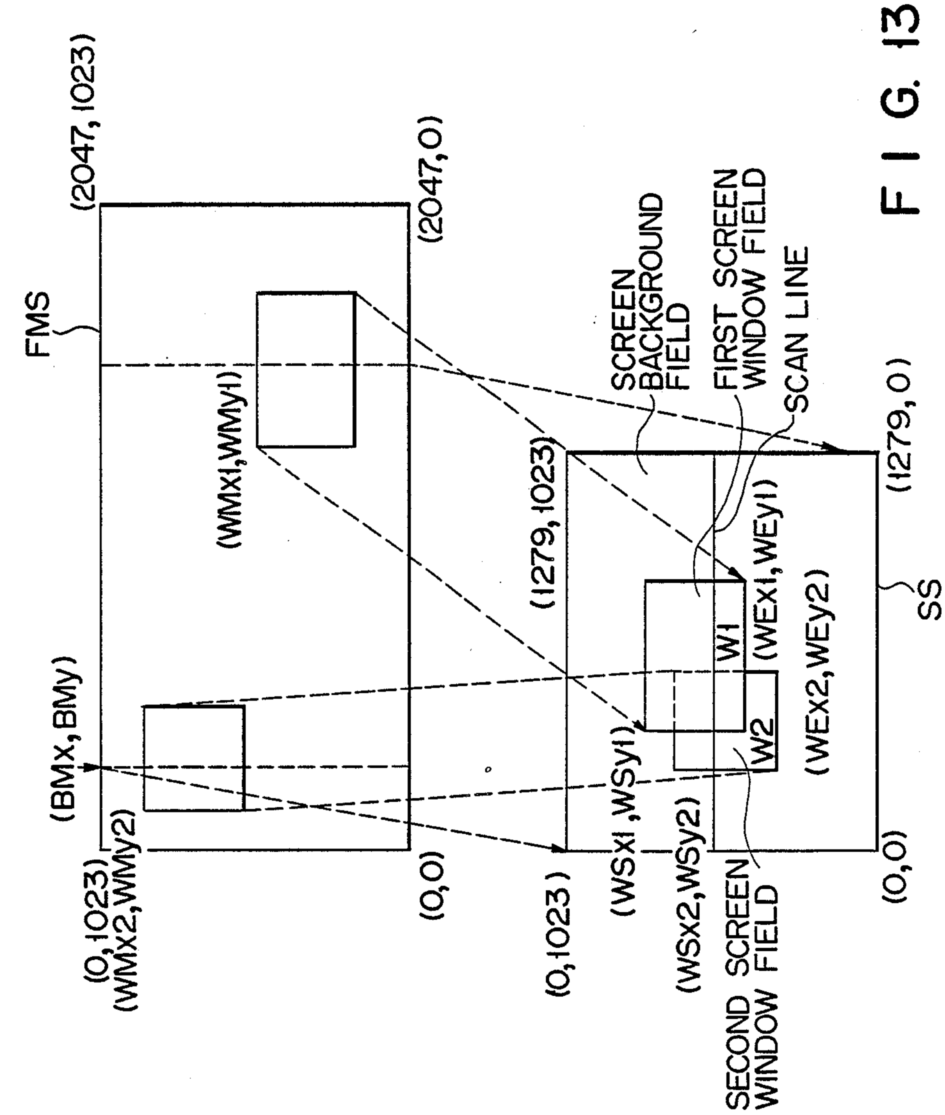
FIG. 13 is a view for explaining the hardware window concept of the second embodiment of the present invention.

First, the hardware window display concept realized by the second embodiment will be described with reference to FIG. 13. Frame memory space FMS of frame memory 17 of this embodiment is the same as that of the first embodiment. In FIG. 13, arbitrary rectangular regions W1 and W2 partially overlap each other on screen space SS. The display start coordinates of regions W1 and W2 are (WSx1, WSy1) and (WSx2, WSy2), respectively, and the display end coordinates thereof are (WEx1, WEy1) and (WEx2, WEy2), respectively. The start coordinates of regions W1 and W2 on the frame memory space are (WMx1, WMy1) and (WMx2, WMy2), respectively.

Figure 12:
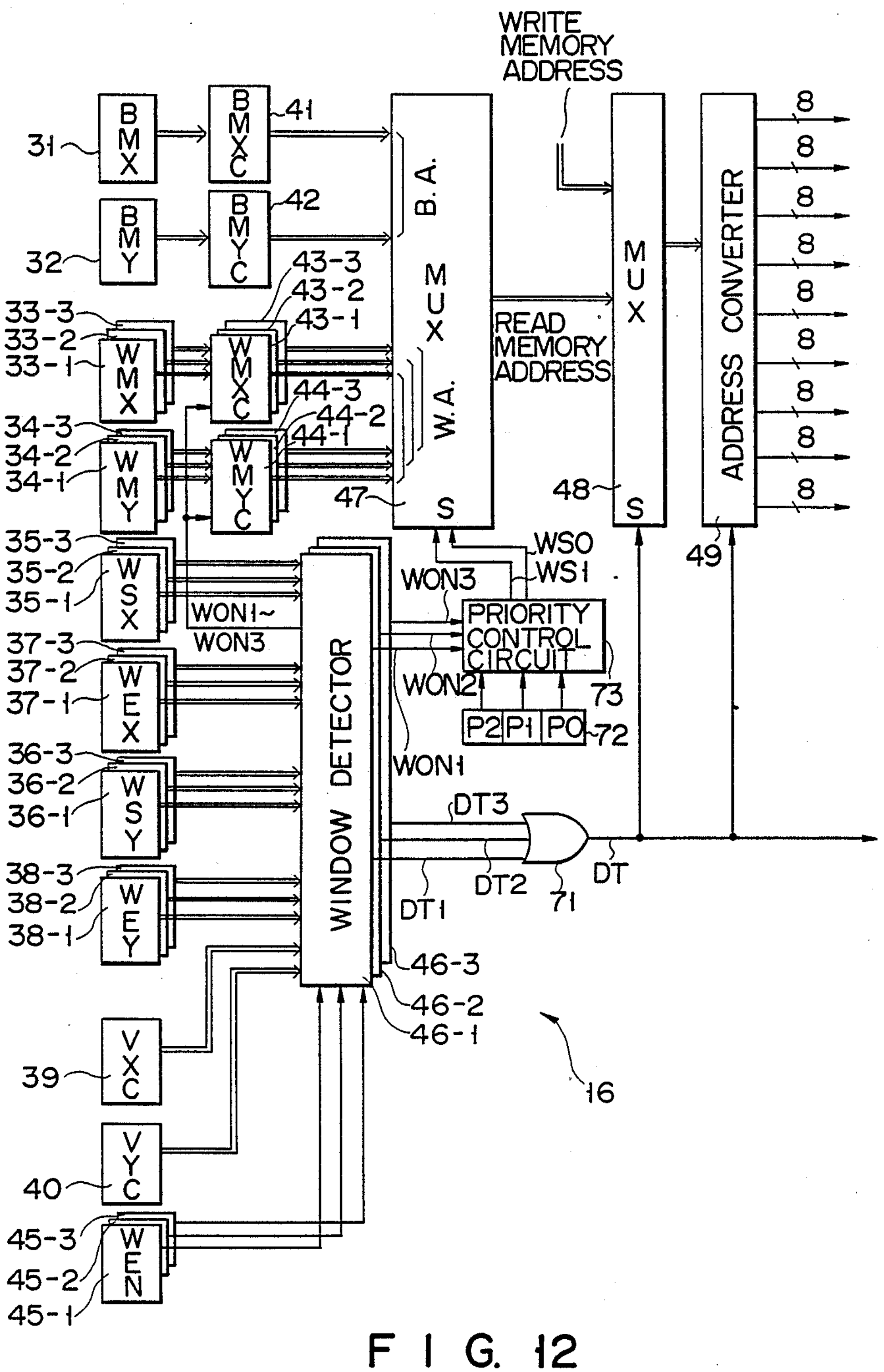
FIG. 12 is a block diagram of a second embodiment of the address controller shown in FIG. 1.

The arrangement of FIG. 12 will be described. Registers 31 and 32 and counters 39, 40, 41, and 42 of address controller 16 of FIG. 12 are identical to those of the first embodiment. Registers 33−j to 38−j, and 45−j counter 43−j and 44−j, and window detectors 46−j (j=1 to 3) are similar to those of the display window controller of the first embodiment. However, signal DT is generated only by detector 46-1 in accordance with a horizontal blanking signal.

Multiplexer MUX 47 selects one as a read memory address from the background read memory address indicated by counters 41 and 42 and one of the window read memory addresses indicated by counters 43-1 and 44-1 to 43-3 and 44-3 in accordance with window selection signals WS0 and WS1 from priority control circuit 73 to be described later. Multiplexer 48 selectively outputs one of a write memory address supplied through write address bus 14*b* of write bus 14 shown in FIG. 1 and the read memory address selectively output from multiplexer 47 in accordance with data transfer signal DT from OR gate 71 to be described later.

OR gate 71 calculates the logic OR of data transfer signals DT1 to DT3 output from window detectors 46-1 to 46-3 and outputs the calculation result as data transfer signal DT. Priority register 72 designates the display priority of windows W1 to W3 by, e.g., 3 bits p0 to p2. Priority control circuit 73 determines the window of the highest priority among the detected windows in accordance with window detection signals WON1 to WON3 from detectors 46-1 to 46-3 and the set value of register 72. The determined window is designated through 2-bit selection signals WS0 (lower bit) and WS1 (upper bit). WS0=WS1=0 indicates a background.

Figures 14, 15:
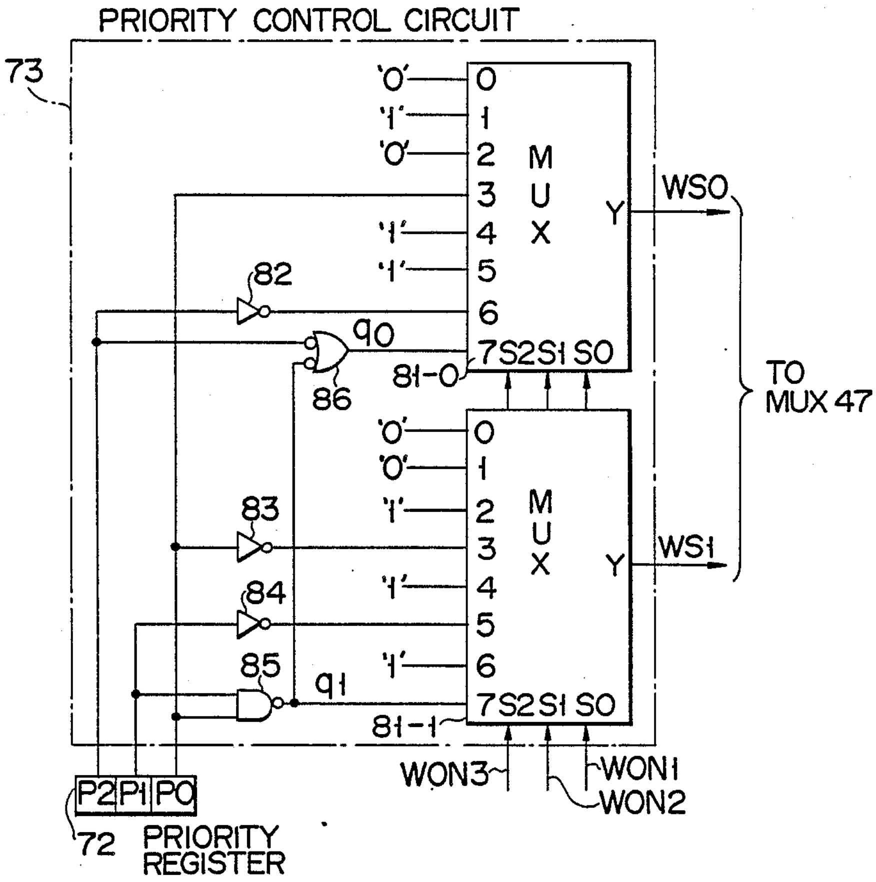
FIG. 14 is a block diagram of the priority control circuit shown in FIG. 12.
FIG. 15 is a table for explaining the operation of the priority control circuit shown in FIG. 14.

FIG. 14 is a block diagram of priority control circuit 73 shown in FIG. 12. Referring to FIG. 14, 8-input, 1-output multiplexers 81-0 and 81-1 respectively have 8 inputs of 0 to 7 and select input signals of inputs i (i is an integer of 0 to 7) designated by window detection signals WON1 to WON3 from window detectors 46-1 to 46-3 shown in FIG. 12 as selection signals WS0 and WS1, respectively. In this embodiment, signals of logic "0", "1", and "0" are fixedly input to inputs 0, 1, and 2, respectively, of multiplexer 81-0 and p0 bit of priority register 72 is input to input 3 thereof. Signals of logic "1" are fixedly input to inputs 4 and 5 of multiplexer 81-0, and a level inverted signal obtained by inverting p2 bit from priority register 72 by inverter 82 is input to input 6 thereof. Signal q0 to be described later is input to input 7 of multiplexer 81-0.

Signals of logic "0", "0", and "1" are fixedly input to inputs 0, 1, and 2 of multiplexer 81-1, and level inverted signal obtained by inverting the p0 bit from priority register 72 by inverter 83 is input to input 3 thereof. A signal of logic "1" is fixedly input to input 4 of multiplexer 81-1, and a level inverted signal obtained by inverting p1 bit from register 72 by inverter 84 is input to input 5 thereof. Furthermore, a signal of logic "1" is fixedly input to input 6 of multiplexer 81-1, and signal q1 is input to input 7 thereof. Signal q1 is an output signal from NAND gate 85 for NANDing p0 and p1 bits of registers 72. Signal q0 is an output signal from OR gate 86 for ORing level inverted signal q1 and the level inverted p2 signal from register 72.

FIG. 15 is a table showing the relationship among contents of p2 to p0 set in priority register 72, display priority of windows W1 to W3, and signals q0 and q1. As apparent from FIGS. 14 and 15, when at least one of window detectors 46-1 to 46-3 detects a screen window field, priority control circuit 73 determines a window of the highest priority among the detected window(s) and outputs selection signals WS1 and WS0 representing the window number of the window of the highest priority. For example, when window W1 is determined as the one having the highest priority, signals WS1 and WS0 are set at "0" and "1", respectively; when window W2 is determined as having the highest priority, signals WS1 and WS0 are set at "1" and "0", respectively. Similarly, when window W3 is determined, both signals WS1 and WS0 are set at "1". In contrast to this, when none of windows W1 to W3 is determined as having the highest priority, i.e., when any of window detection signals WON1 to WON3 are at logic "0", both signals WS1 and WS0 are set at "03[ and a background is displayed.

Referring to FIG. 1, frame memory/controller 17', shift register section 19, LUT 20, DAC 21, CRT 22, data controller 18, and write controller 13 are the same both in the first and second embodiments. Address converter 49 in address controller 16 is the same both in the first and second embodiments.

The operation of the second embodiment will be described.

Normal background display is the same as in the first embodiment and is thus omitted.

Hardware window display of a case wherein regions W1 and W2 partially overlapping each other as shown in FIG. 13 are scanned with a scan line shown in FIG. 13 will be described with reference to the timing charts of FIGS. 16A to 16H.

CPU 11 sets start coordinates WMx1, WMy1) of the frame window for hardware window W1 in start coordinate registers 33-1 and 34-1 in address controller 16 and start coordinates (WMx2, WMy2) for hardware window W2 in registers 33-2 and 34-2. CPU 11 also sets start coordinates (WSx1, WSy1) for window W1 in registers 35-1 and 36-1 and start coordinates (WSx2,WSy2) for window W2 in registers 35-2 and 36-2.

Similarly, CPU 11 sets end coordinates (WEx1, WEy1) for window W1 in registers 37-1 and 38-1 and end coordinates (WSx2, WSy2) for window W2 in registers 37-2 and 38-2. Furthermore, CPU 11 sets window enable registers 45-1 and 45-2.

When window enable registers 45-1 and 45-2 are set, display of windows W1 and W2 is permitted. In this case, window detector 46-1 sets window detection signal WON1 at "1" while the y-coordinate of the scan display address indicated by counter 40 falls within the boundary in the y direction of the window w1 indicated by registers 36-1 and 38-1 and the x-coordinate of the display address indicated by counter 39 falls within the boundary in the x direction of window W1 indicated by register 35-1 and 37-1. Furthermore, detector 46-1 sets data transfer signal DT1 at "1" during a memory cycle where the count of counter 39 coincides with the value of register 35-1 or 37-1. Window detector 46-2 performs the same operation as this.

Assume that window detection signal WON1 is set at "1" among signals WON1 to WON3 from window detectors 46-1 to 46-3. In this case, priority control circuit 73 outputs selection signal WS1 of logic "0" and selection signal WS0 of logic "1" to multiplexer 47 in order to designate window W1. In response to WS1=0 and WS0=1, multiplexer 47 selects the first window read memory address of window W1 indicated by memory address counters 43-1 and 44-1.

Data transfer signal DT of logic "1" is output from window detector 46-1 while window detection signal WON1 is at "1", i.e., during first memory cycle T1 of the detection period of the display region of window W1. OR gate 71 sets signal DT at logic "1" during cycle T1 as shown in the timing chart of FIG. 16G. When signal DT is at "1", the read memory address (in this case, the window memory address for displaying window W1) selectively output from multiplexer 47 is selectively output to address converter 49 by multiplexer 48. Operations after this is the same as in the first embodiment.

Figure 16:
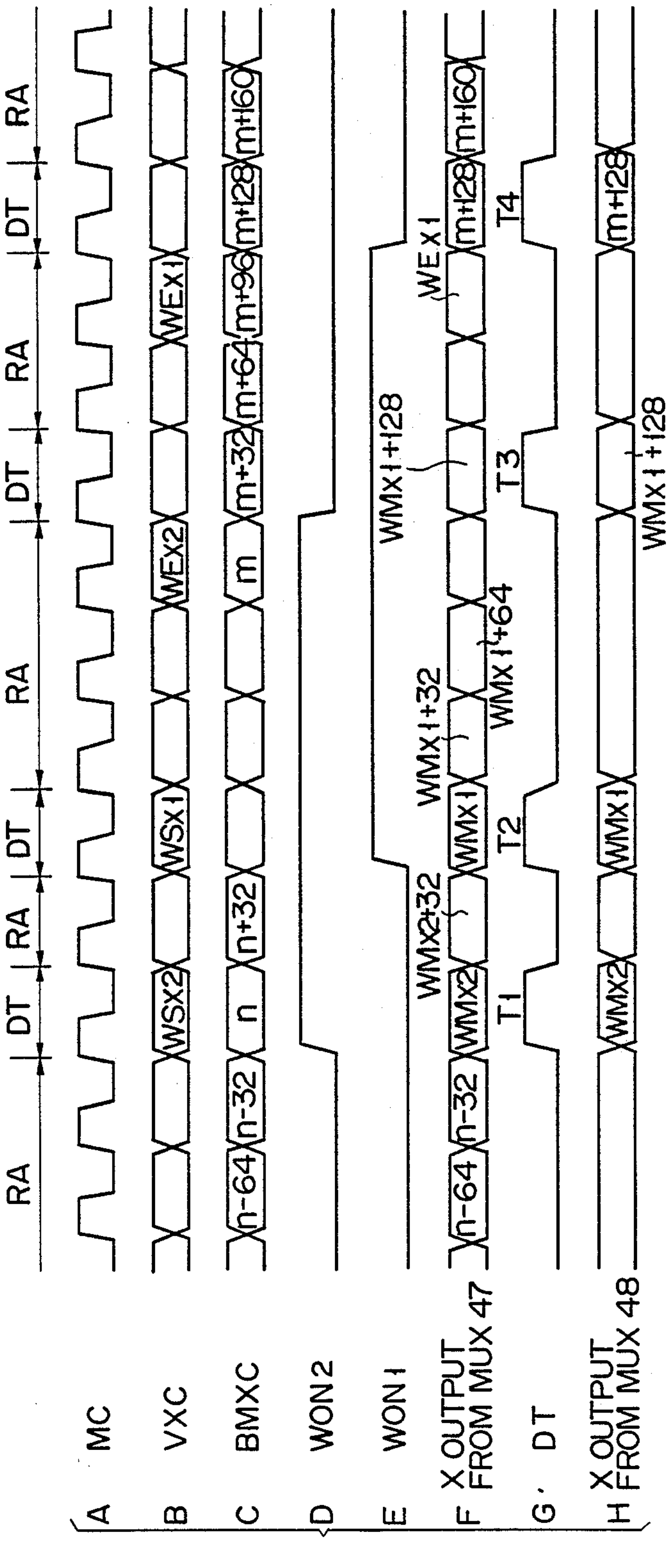
FIGS. 16A to 16H are timing charts for explaining the operation for the hardware window display according to the second embodiment of the present invention.

Window W1 is displayed in the above-described manner. Then, when the left boundary of the display region of window W2 is detected by window detector 46-2, detector 46-2 outputs window detection signal WON2 of logic "1" as shown in FIG. 16E. When selection signals WS1 and WS2 are at logic "1", i.e., when display regions of windows W1 and W2 are detected by detectors 46-1 and 46-2, priority control circuit 73 determines a window of a higher priority in accordance with the content set in priority register 72. Assume that window W2 has a higher priority (W2>W2) over window W1 by register 72. Priority control circuit 73 outputs selection signal WS1 of logic "1" and selection signal WS0 of logic "0" to multiplexer 47 in order to designate window W2. In response to WS1=1 and WS0=0, multiplexer 47 selects a memory address for displaying window W2 which is indicated by memory address counters 43-2 and 44-2.

While window detection signal WON2 is at "1", i.e., during first memory cycle T2 of the detection period of the display region of window W2, data transfer signal DT2 of logic "1" is output from window detector 46-2, and thus data transfer signal DT is set at logic "1" again, as shown in FIG. 16G. As a result, during memory cycle T2, the window read memory address for displaying window W2 which is selectively output from multiplexer 47 is selectively output to address converter 49 by multiplexer 48. Then, the same operation as in the first embodiment is performed.

Window W2 is displayed in the above manner. Then, when the count of counter 39 coincides with the value of register 37-1, window detector 46-1 detects the right boundary of the display region of window W1, sets signal WON1 at logic "0" again, as shown in FIG. 16D, and sets data transfer signal DT1 at "1" again in next memory cycle T3. In this case, window W1 having a higher priority over window W2 is being displayed and window detection signal WON2 of logic "1" is still output from window detector 46-2. Therefore, data selectively output from multiplexer 47 remains the read memory address for displaying window W1 which is indicated by counters 43-2 and 44-2. In cycle T3, signal DT can be disabled since a data transfer cycle for the display region of window W1 is not needed.

When the count of scan counter 39 coincides with the value of register 37-2, window detector 46-2 detects the right boundary of the display region of window W2, sets signal WON2 to logic "0" again, as shown in FIG. 16D, and sets data transfer signal DT2 to "1" again in next memory cycle T4. When signal WON2 is set at "0", signals WON1 and WON2 are also set at "0". Therefore, priority control circuit 73 sets selection signals WS1 and WS0 at "0" in order to designate a background. When signals WS1 and WS0 are set at "0", the address for displaying the background which is indicated by memory address counters 41 and 42 is selected by multiplexer 47, as described above. The background display address selected by multiplexer 47 is selectively supplied to address converter 49 by multiplexer 48 during cycle T4 for DT=1 and further converted into an address by converter 49 and supplied to frame memory 17, thereby resuming the background display described above.

As described in this embodiment, the x-coordinate (display start coordinate) of (frame memory space FMS of) frame memory 17 for performing background display and window display can be precisely designated up to a multiple of 4. Note that a display start y-coordiante can be designated in units of dots both in background display and window display.

A bit map display apparatus has been described above. The present invention can also be applied to an apparatus having a frame memory and extracting and outputting the content of a given rectangular region of the frame memory, e.g., a bit map image processing apparatus like a laser printer or an electrostatic plotter.

What is claimed is:

1. A bit map image processing apparatus adapted for hardware window display, comprising:

frame memory means for storing image data in a frame memory space, the frame memory space including a frame background FB field and m frame window FW fields where m is a positive integer, the image data including FB field image data indicative of the FB field and m FW field image data corresponding to the m FW field;

control means for generating FB field designating data and m FW field designating data in response to an input transfer command;

frame memory control means for selectively reading out a word of screen image data including one of the FB field image data to be displayed as a screen background SB field, and the m FW field image data, to be displayed as m screen window SW fields, respectively, superimposed on said screen background SB field, from said frame memory means in accordance with input memory addresses;

display means for displaying the screen image data from said frame memory control means on a screen field in synchronism with scanning of display positions, the screen field comprising said screen background SB field and said m screen window SW fields within an area defined by said screen background SB field;

first generation means operating in synchronism with the scanning of the display positions, for generating FB field memory addresses in accordance with the FB field designating data from said control means;

second generation means operating in synchronism with the scanning of the display positions, for respectively generating m FW field memory addresses in accordance with the m FW field designating data from said control means; and window display control means responsive to the scanning of the display positions, positions of the m SW fields within the SB field and m priorities associated with the m SW fields, for selectively outputting as the memory addresses one of the FB field memory addresses and the m FW field memory addresses.

2. The apparatus according to claim 1, wherein said frame memory means comprises k memory means for storing k data blocks where k is a positive integer, constituting each said word of the image data at a first portion of each memory address, all of the image data including a plurality of said words, each said word including the k data blocks, each data block including at least one bit, and said frame memory control means includes means for converting each of the memory addresses into k individual memory addresses in accordance with as second portion of each memory address, and for respectively outputting the k individual memory addresses to said k memory means,

3. The apparatus according to claim 1, wherein m is 1, and said window display control means comprises:

window detecting means for detecting from a scanned display position and the position of the SW field that the scanned display position falls within the SW field; and memory address selecting means for selecting as the memory addresses one of the FB field memory addresses and the FW field memory addresses in accordance with a detecting result of said window detecting means and outputting the memory addresses to said frame memory control means.

4. The apparatus according to claim 1, wherein m is more than 1, and said window display control means comprises:

window detecting means for detecting from a scanned display position and the positions of the m SW fields that the scanned display position falls within each of the m SW fields;

holding means for holding m priorities associated with the m FW fields; and memory address selecting means for selecting as the memory addresses one of the FB field memory addresses and the m FW field memory addresses in accordance with a detecting result of said window detecting means associated with the m SW fields and the m priorities and outputting the memory addresses to said frame memory control means.

5. A bit map image processing apparatus adapted for hardware window display, comprising:

frame memory means for storing image data in a frame memory space, the frame memory space including a frame background FB field and m frame window FW fields where m is a positive integer, the image data including FB field image data in the FB field and m FW field image data corresponding to the m FW field, said frame memory means for holding out of the FB and m Fw field image data in accordance with memory addresses indicative of a data transfer memory cycle input to said frame memory means and outputting the held image data as screen image data in synchronism with scanning of display positions;

control means for generating FB field designating data to be displayed as a screen background SB and m FW field designating data to be displayed as m screen window fields SW, respectively, superimposed on said screen background SB in response to an input transfer command;

display means operating in synchronism with the scanning of the display positions and the memory addresses, for displaying the screen image data from said frame memory means on a screen field, the screen field comprising said screen background SB field and said m screen window SW fields;

first generation means, operating in synchronism with the scanning of the display positions, for generating FB field memory addresses in accordance with the FB field designating data from said control means;

second generation means operating in synchronism with the scanning of the display positions, for respectively generating m FW field memory addresses in accordance with the m FW field designating data from said control means; and window display control means, responsive to the scanning of the display positions and window positions of m FW fields within the SB field being displayed and m priorities associated with the m SW fields, for defining the data transfer memory cycles, for selecting as the read memory addresses one of the FB field memory addresses and the m FW field memory addresses, for defining the read memory addresses in the transfer cycles as the transfer cycle memory addresses, and for outputting the transfer cycle memory addresses to said frame memory means and the read memory addresses to said display means.

6. The apparatus according to claim 5, wherein said window display control means includes means for defining as the transfer cycles the memory cycles corresponding to a start boundary of the SB field and start and end boundary of the m SW fields having a higher priority.

7. The apparatus according to claim 6, wherein said window display control means includes means for selecting one of the FW field memory addresses as the transfer cycle memory addresses in accordance with the m priorities.

8. The apparatus according to claim 5, wherein said frame memory means comprises:

k memory means for storing k data blocks, where k is a positive integer, constituting each word of the image data at a first portion of each memory address, respectively, the image data including a plurality of words, each word including the k data blocks, each data block including at least one bit, each said memory means for holding one of the FB and m FW field image data in synchronism with the scanning of the display positions; and address converting means includes means for converting each of the transfer cycle memory addresses into individual transfer cycle memory addresses for said k memory means in accordance with a second portion of each memory address, and for respectively outputting the k individual transfer cycle memory addresses to said k memory means.

9. The apparatus according to claim 8, wherein each of said k memory means includes means for sequentially outputting the held image data from the data block designated by the individual transfer cycle memory address in units of data blocks for every memory cycle.

10. The apparatus according to claim 5, wherein m is 1, and said window display control means comprises:

window detecting means for detecting from a scanned display position and a position of the SW field that the scanned display position falls within the SW field, and defining as the transfer cycles, memory cycles corresponding to a start boundary of the SB field and a start boundary and an end boundary of the SW field; and memory address selecting means for selecting as the read memory addresses one of the FB field memory addresses and the FW field memory addresses in accordance with a detecting result of said window detecting means, for defining the read memory addresses in the transfer cycles as the transfer cycle memory addresses and for outputting the read memory addresses to said display means and the transfer cycle memory addresses to said frame memory means.

11. The apparatus according to claim 5, wherein m is more than 1, and said window display control means comprises:

window detecting means for detecting from a scanned display position and positions of the m SW fields that the scanned display positions falls within each of the m SW fields and for defining as the transfer cycles the memory cycles corresponding to a start boundary of the SB field and a start and an end boundary of the SW field having a higher priority determined by comparing current priorities;

holding means for m priorities associated with the m FW fields; and memory address selecting means for selecting as the read memory addresses one of the FB field memory addresses and the m FW field memory addresses in accordance with detecting results of said window detecting means associated with the m SW fields and the m priorities, for defining as the transfer cycle memory addresses the read memory addresses in the transfer cycles and outputting the read memory addresses to said display means and the transfer cycle memory addresses to said frame memory means.

12. The apparatus according to claim 5, further comprising:

means for generating write memory addresses and outputting write words and the write memory addresses to said frame memory means in the memory cycles except for the transfer cycles, and wherein said frame memory means includes means for writing the write words at the write memory addresses respectively.

13. A method of performing a hardware window display function, comprising the steps of:

generating frame background FB field designating data and m frame window FW field designating data, where m is a positive integer, in response to a transfer command;

generating FB field memory addresses in accordance with the FB field designating data and in synchronism with scanning of display positions and respectively generating m FW field memory addresses in accordance with the m FW field designating data and in synchronism with the scanning of the display positions;

defining data transfer cycles from a position of scanning of the display positions, window positions of m screen window SW fields within a screen background SB field and m priorities associated with the m SW fields to determine as transfer cycle memory addresses read memory addresses in the transfer cycles, one of the FB field memory addresses and the m FW field memory addresses being selected as the read memory addresses;

holding in frame memory means as screen image data one of FB and m FW field image data to be displayed as the m screen window SW fields in accordance with the transfer cycle memory addresses indicative of said data transfer cycles, the frame memory means storing image data in a frame memory space, the frame memory space including the FB field image data and the m FW field image data, the image data including the FB field image data on the FB field and the m FW field image data corresponding to the m FW field; and displaying screen image data on a screen field in synchronism with the scanning of the display positions, the screen field comprising the screen background SB field and the m screen window SW fields.

14. The method according to claim 13, wherein said defining data transfer cycles step includes defining, as the transfer cycles, memory cycles corresponding to a start boundary of the SB field and start and end boundaries of m SW fields having a higher priority determined by comparing current priorities.

15. The method according to claim 14, wherein said determining step of the transfer cycle memory address includes selecting one of the m FW field memory addresses as the transfer cycle memory addresses in accordance with m priorities.

16. The method according to claim 13, further comprising:

generating write memory addresses; and writing new words at the write memory address of the frame memory means in the memory cycles except for the transfer cycles.

* * * * *